United States Patent Office 2,703,810
Patented Mar. 8, 1955

2,703,810

DERIVATIVES OF GLYCOL URETHANES AND METHODS OF MAKING THEM

Marcel Jean Viard, Bois-Colombes, France, assignor to Societe Anonyme des Manufactures des Glaces et Produits Chimiques de Saint-Gobain, Chauny & Cirey No Drawing. Application September 5, 1951, Serial No. 245,257

16 Claims. (Cl. 260—471)

This invention relates to new materials, the glycol polyurethanes and to processes for making them. These new products are useful by themselves in the manufacture of fabric finishes, and varnish, for instance, and in organic synthesis, particularly in the manufacture of plastics.

The new products are obtained by the reaction of isocyanates on glycol urethanes, (glycol carbamates).

The glycol urethanes are described in my copending applications Serial Numbers 244,265 filed August 29, 1951, now abandoned, and 244,266 filed August 29, 1951, and it is observed that these compounds correspond usually to one of the following formulas:

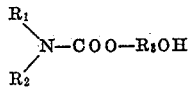

in which $R_1$ and $R_2$ are hydrogen, or carbon of an organic radical which may be linear or cyclic, and which may be a pure hydrocarbon radical or heterogeneous, and $R_3OH$ is an alcohol radical of which $R_3$ is the radical supplied by the glycol employed in making the glycol urethane. The radicals $R_1$, $R_2$ may also have substituents, such for example as hydroxy in the alkylolurethanes of the formula:

$$OH—R_2—NH—CO—O—R_3OH$$

in which $R_2$ is alkyl.

Another group of the glycol urethanes (or glycol carbamates) are those which are derived from diamines, are called glycol diurethanes (dicarbamates) and are represented by the formulas:

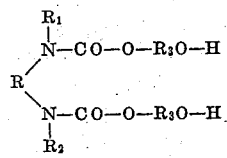

or

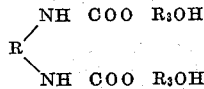

in which R is a divalent radical linear or cyclic. The significance of the radicals $R_1$, $R_2$ and $R_3$ is as above defined. A third group of diurethanes are those which are derived from hydrazine and which have the formula:

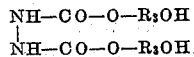

The significance of $R_3$ being the same.

When the urethanes are reacted with isocyanates, new compounds are produced which are of excellent properties and very valuable in a variety of uses. The isocyanates enter in the reaction as a class but this class can be roughly divided into three groups all of which, however, contain the same active group; the monoisocyanates are represented by the formula $R_4N=C=O$ in which $R_4$ is a monovalent organic radical which may be linear or cyclic but the compounds containing cyclic radicals have particular valuable properties; the diisocyanates are generally represented by the formula:

in which $R_4$ is divalent organic radical, linear or ring; and the polyisocyanates of the formula $R_n(NCO)_n$ in which R has the significance above and $n$ is a digit corresponding to the valence of R.

The process is flexible and makes it possible to produce at will compounds having properties that are widely different. Indeed, not only can one produce different products by changing the raw materials which enter into the reaction, but by changing the reaction conditions, either upon the same raw materials or while also changing the raw materials.

The characteristics of the product obtained can be influenced by a number of changes in the process, for example, the characteristics of the product can be changed by changing the proportions of the reactants which are employed in the reaction; a change will also be made by changing the temperature at which the process is carried out, or by first conducting the reaction at one temperature and then subjecting the first product to a different degree of heat to produce a different product or to modify the characteristics of the first product; the reaction can be carried out without a solvent or in solution and the characteristics of the products differ accordingly; the duration of heating as distinct from the degree, is also useful in altering the characteristics of the product. The basic reactions of the invention are carried out very simply, by heating the raw materials, the isocyanate and the urethane, in solvent, in admixture with each other, the different raw materials being present in quantities selected to produce products of the desired characteristics. The end of the reaction is easy to find because it is signalized by the disappearance of the characteristic odor of the isocyanates. In some cases the reaction is strongly exothermic and it is preferably cooled. In other cases it does not go readily at ordinary temperature and the reaction mass must be heated for best results. It is advantageous to carry out the reactions with monoisocyanates below 100° C. but with the polyisocyanates that is not necessary and the temperature may be allowed to ascend to about 100° C. because the polymerization which occurs with monoisocyanates does not appear to occur when the polyisocyanates are employed.

In many cases the new compound obtained by the process is characterized by the presence in a molecule of one or more groups $=N—COO—R_3—OOC—N=$. The nature of the substituents on the double bonds is exemplified in the example and elsewhere herein. The general term for these new compounds would be diurethane as they contain twice the function urethane $=N—COO—$ but in view of eliminating any confusion with the diurethane above referred to (in which the two functions $=N—COO—$ are not bound to the same radical $R_3$ but to two different radicals) one has adopted here the term polyurethane for these new products, all the more as these products may contain more than two urethane functions and for example may include two groups $=N—COO—R_3—OOC—N=$. These polyurethanes may also be considered as mono or dicarbamates of glycol urethanes.

Additional classification is made by reference to the examples wherein, for example, the cyclic polyurethanes, which are ring compounds, appear. Other classifications will be apparent as the examples hereinafter are studied.

In the formula which follow, $R_1$ and $R_2$ have been employed to indicate hydrogen or an organic radical, $R_3OH$ is an alcoholic radical, the $R_3$ being the glycol nucleus of the urethane, which is usually aliphatic and of which the simplest is $CH_2—CH_2$ which corresponds to ethylene glycol, but the invention extends beyond the simplest members of the glycols and includes all the glycol urethanes. Selected examples of the urethanes are given hereinafter as illustrations of the general utility of the class.

The following examples have been selected to demonstrate the use of particular urethanes of glycol, the use of particular isocyanates, the use of various proportions, and the use of various controls to produce different characteristics in the products.

The following classification is only one of several which could be adopted and it has been employed because it readily demonstrates certain marked distinctions.

CLASS 1

If there are employed as raw materials monourethanes of glycol and the monoisocyanates in equal molecular quantities in a reaction carried out below 100° C. the following reaction occurs:

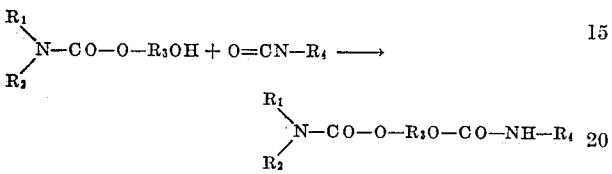

In this equation $R_1$ and $R_2$ are hydrogen or an organic radical, which may be straight or ring, and which are preferably defined as C of that radical, $R_3$ being the glycol nucleus of the urethane and $R_4$ the organic radical of the isocyanate. These definitions will be generally adhered to throughout the specification. Under these conditions the reaction takes place solely on the HO group of the glycol urethane. It does not affect the groups $NH_2$ or $NHR_1$ and this is true when even an excess of isocyanate is present, the other conditions remaining the same.

CLASS 2

The reaction is similar if there is employed as raw materials the monourethanes and the polyisocyanates, but in this case it is necessary to employ as many molecules of monourethane as there are isocyanate groups on each isocyanate molecule. For example, with the diisocyanates one should employ two molecules of monourethane for one of diisocyanate as illustrated by the reaction:

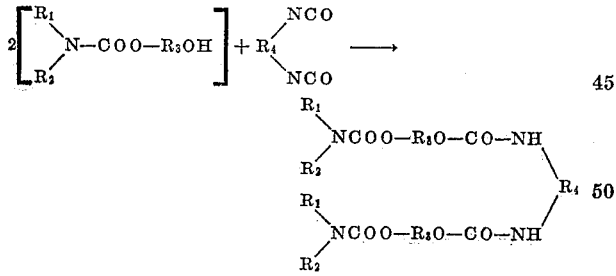

Glycol urethane carbamates thus obtained are present as colorless and odorless crystals slightly soluble in most cold organic solvents, but soluble in those same solvents when hot. The following examples illustrate the reaction of members of Classes 1 and 2 of the isocyanates/urethanes derivatives.

Example 1

There is heated on a water bath between 80 and 90° C. a mixture of 135 grs. (1 mol.) of glycol ethyl urethane and 120 grs. (1 mol.) of phenyl isocyanate. The heating is stopped after 7 to 8 hours when the odor of isocyanate disappears. When the reaction mass is cooled, the product is present as a hard solid mass that can be recrystallized in hot alcohol. There is thus obtained 235 grs. of an odorless, colorless crystaline compound fusing at 99° C. and represented by the formula:

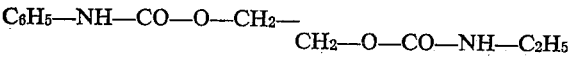

which may be called a polyurethane but which may be also considered as a phenylcarbamate of glycol ethylurethane.

Example 2

Under the conditions of Example 1, a mixture of 217 grs. of glycol N-dibutylurethane and 120 grs. of phenyl isocyanate (molar quantities). The operation came to an end in about 8 hrs. After cooling the product was dissolved in hot benzine. An insoluble part weighing 20 grs. was removed and decomposed while melting at 240° C., giving off a strong isocyanate odor. This body was an isocyanate polymer. From the benzine liquid there was separated by cooling and crystallization a product melting at 51–52° C. and represented by the formula:

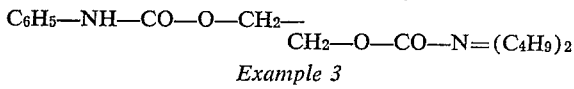

Example 3

There was mixed in a flask 1 mol. of glycol urethane, 1 mol. of phenyl isocyanate and 500 grs. of acetone solvent. A limped solution was obtained and left for 12 hours at about 15° C., after which the isocyanate odor had disappeared and white crystals of diphenylurea were formed in the flask and separated by filtration. The liquid was distilled to eliminate the acetone and the residue was purified by crystallization from alcohol. There was thus obtained 190 to 195 grs. of white crystals of glycol urethane phenyl carbamate, fusing at 115–116° and represented by the formula:

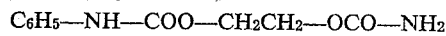

This product is soluble in alcohol and benzine and is insoluble in water.

Example 4

With strong cooling a mixture of glycol piperidylurethane and phenyl isocyanate were reacted in molar quantities and kept from 5 to 6 hours at 50°. The product obtained was purified by crystallization in alcohol and constituted a white solid melting at 89°, insoluble in water, soluble in alcohol and represented by the formula:

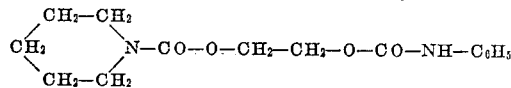

The yield was 94%.

Example 5

Into a reaction vessel provided with a good mechanical agitation there was introduced 1 mol. of monourethane of 1–2 propylene glycol and 1 mol. of phenylisocyanate. The temperature rose by itself to 40° while the mixture first formed two layers and then became homogeneous. The temperature was held at 40° for 8 to 9 hours. The product is a solid white mass insoluble in water and very soluble in hot alcohol and benzine. It was purified by crystallization in 1½ times its weight of benzine and yielded a white solid melting at 98° which is constituted by the propyleneglycol urethane phenylcarbamate of the formula:

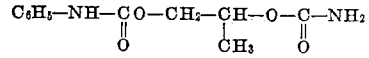

The yield was 92% of theory, representing total transformation of the two reactions to the final desired product.

Example 6

Into a flask there is slowly introduced 1 mol. of phenyl isocyanate and 1 mol. of 1–2 propylene glycol N-ethylurethane. The two bodies were perfectly soluble in each other. The temperature rose to 40° and was held there for 10 to 12 hours. The product was a viscous, light yellow mass which slowly transformed itself into a solid, very soluble in alcohol and benzine. After purification, it was crystallized in benzine and yielded 335 grs. of white crystals melting at 70° and represented by the propyleneglycol urethane phenylcarbamate of the formula:

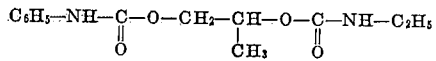

The yield was 88° of theory.

Example 7

In a flask there was mixed 1 mol. of glycol urethane, ½ mol. of hexamethylene diisocyanate and 200 grs. of acetone solvent. The mixture was raised from 30 to 35° and a homogeneous liquid was produced and kept at that temperature for about 12 hours. The acetone was then eliminated by distillation and the residue was purified by crystallizing in alcohol. 174 grs. of the product melting at 138° was obtained, corresponding to the formula:

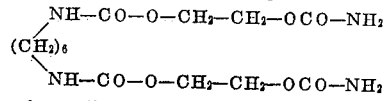

a glycol urethane dicarbamate.

Example 8

169 grs. of glycol N-diethylurethane and 84 grs. (½ mol.) of hexamethylene diisocyanate were mixed and heated at 100° for 6 to 8 hours. When the mass was cooled, crystals precipitated throughout and were recrystallized and purified by the hot alcohol. The product represented 230 grs. of a body melting at 74° and constituted by a glycol N-diethylurethane dicarbamate of the formula:

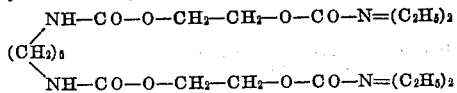

melting at 74° and weighing 230 grs.

Example 9

Operating as in Example 8, but with glycol N-dibutylurethane (1 mol.) and hexamethylene diisocyanate (½ mol.) there was obtained a product melting at 30°, soluble in cold alcohol, benzine, dioxane, dichlorethane and insoluble in water.

Example 10

With agitation there was mixed 1 mol. of glycol urethane and ½ mol. of toluylene diisocyanate and the mixture was heated on the water bath. At 45° the reaction began and the temperature rapidly rose to 70° even though the heating was stopped. After the temperature descended again to 50° it was again heated to 65 to 70° for 5 or 6 hours. The mass obtained recrystallized in alcohol yielding 269 grs. of a product melting at 103–104° which is represented by the formula:

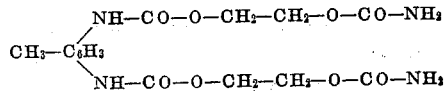

It is called glycol urethane toluylene dicarbamate. This product is insoluble or only slightly soluble in the cold water, alcohol, benzine and chloroform, but is soluble in hot alcohol.

Example 11

There is prepared a mixture of 105 grs. (1 mol.) of glycol urethane in 250 grs. of acetone solution and there is slowly added to this solution, the rate being regulated to keep the temperature below about 20°, 87 grs. of toluylene diisocyanate, the same materials and proportions as in Example 10. The mixture is allowed to rest from 2 to 3 hours at room temperature and there is obtained a product different from that of Example 10 having the appearance of a white jelly. After elimination of acetone by distillation there are obtained 350 grs. of a crude urethane carbamate melting at 100–110° and less pure than in the preceding example.

Example 12

Into a reaction vessel there is placed 1 molar quantity of 1-2 propylene glycol urethane and ½ molar quantity of hexamethylene diisocyanate. A heterogeneous mixture is obtained which is heated at 95° on the water bath, becoming homogeneous after 1½ hours, crystals separating out as the heating is continued. After 7 to 8 hours, the heating is stopped and by chilling there is obtained a hard white body that can be crystallized in alcohol. Thus there is obtained a 96% yield of a product melting at 116° which is constituted by the polyurethane of the formula:

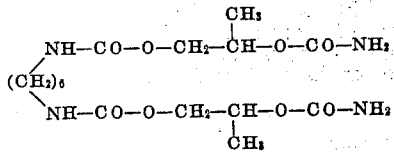

which is also glycolurethane hexamethylenebicarbamate.

Example 13

A mixture is heated at 60 to 65° for 15 hours 147 parts by weight of 1-2 propylene glycol N-ethyl urethane in 300 grs. of benzine and there is added ½ mol. by weight of hexamethylene diisocyanate. The mixture is heated at 60–65° for about 15 hours and a mass is obtained containing crystals in suspension which are removed by filtration. The benzine solution is then evaporated and then there are obtained 220 grs. of crystals melting at 94° constituted by the polyurethane of the formula:

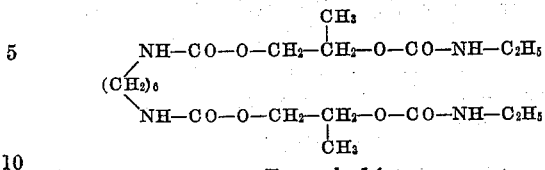

Example 14

1 mol. of ordinary 1-2 propylene glycol monourethane and ½ mol of toluylene diisocyanate are reacted with cooling to keep the temperature around 35°. The reaction mixture is then kept at this temperature, after the exothermic reaction has moderated, for 7 to 8 hours, heating gently. When the exothermic reaction has ended there is obtained a hard white mass floating on a benzine bed. The white mass is purified by crystallization in alcohol and there is thus obtained 180 grs. of the product melting at 75° which is constituted by the polyurethane of the formula:

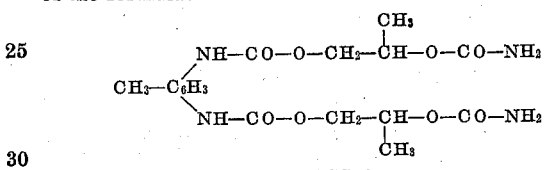

CLASS 3

This class includes the products which are made by the reaction of mono isocyanates on glycol alkylene diurethanes. The polyurethanes thus obtained are different from those of Class 2 because in it the radical $R_4$ provided by the diisocyanate is introduced between the two polyurethane groups while in the polyurethane of the 3rd class the radicals provided by the monoisocyanate are introduced at the extremities of the molecule. The following examples illustrate the general formula for the reactions of this group is:

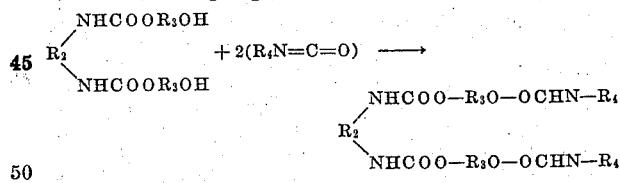

the preferred name for the class is di(carbamyl) glycol diurethanes, the reaction of monoisocyanates upon urethanes derived from diamines. Such for example as the alkylene diurethanes.

Example 15

There was dissolved in 500 grs. of hot acetone 59 grs. (.25 mol.) of glycol NN' ethylene diurethane and there was introduced into the mixture at 50° C., 59.5 grs. of phenyl isocyanate (.5 mol.) the mass was heated at the temperature of ebullition of acetone for 8 hours and was then allowed to cool to room temperature. A white product separated that was isolated by drying. After recrystallization in dioxane there was obtained 78 grs. of a white product melting at 179–180° and represented by the formula:

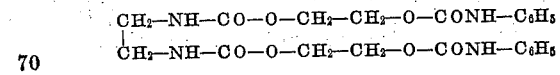

The yield was 94% based on the ethylene diurethane transformed into the final product which was recovered from the mother liquors.

Example 16

Into a flask provided with an agitator, there was introduced glycol NN' hydrazino diurethane ½ mol. (89 grs.), tetrahydrofurane 200 grs., phenyl isocyanate 1 mol. (120 grs.). The mixture was allowed to rest for 24 hours at ordinary temperature and there was obtained a pasty mass which is not possible to mix. After removing the tetrahydrofurane residue by distillation, a solid mass was obtained that was washed in water to dissolve the unreacted urethane. The residue was dissolved in 10 times its weight in alcohol and there was separated by fractional crystallization 20 grs. of diphenylurea and thereafter 150 grs. of a product melting at 233° having the formula:

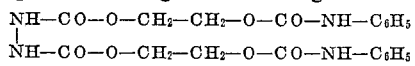

The yield was about 83% based on the hydrazino diurethane recovered.

*Example 17*

Glycol hexamethylene diurethane was heated on the water bath in admixture with phenyl isocyanate in proportion to ½ mol. of the former to ½ mol. of the latter. When the temperature reached 85°, the reaction began and the temperature rose quickly to 135°, even though the heating was stopped. The temperature then fell and the product became more and more viscous, finally becoming a hard mass. The reaction was completed by heating the product at 100° for 5–6 hours, yielding a very hard yellow product that was recrystallized from dioxane, yielding 230 grs. of a white crystalline product melting at 148° and represented by the formula:

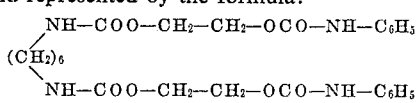

CLASS 4

These products are formed by the reaction of isocyanates with those glycol monourethanes that are derived from alkylol amines of which the glycol ethanolurethanes are exemplary, and they are represented by the formula:

The products can be called polyurethanes, a term which is also applicable to the other products produced in this specification. The reaction employs two molecules of isocyanate for each molecule of alkylol urethane of which the following example is illustrative.

*Example 18*

Into a reaction vessel there is introduced with vigorous agitation glycol N-ethanol urethane and phenyl isocyanate in the proportion of 149 grs. of the former to 238 of the latter; the temperature rises by itself to 30° C. and is kept there for 6–8 hours by heating. It is then heated to 90° for 6 hours. The product is a while mass that can be recrystallized from 75 parts of dioxane and 325 parts of water, yielding 230 grs. of crystals melting at 152–153° which are insoluble in water and slightly soluble in the usual organic solvents either hot or cold, but quite soluble in dioxane. The formula for the compound is as follows:

C₆H₅-NH-COO-CH₂-CH₂-OCO-NH-
CH₂-CH₂-OCO-NH-C₆H₅

CLASS 5

In Class 2, two molecules of monourethane were reacted with one molecule of diisocyanate at a temperature below 100° C. The applicant has found that if these same initial materials were reacted in the same proportions, but at a temperature above 100°, the reaction of Class 2 occurs but at the same time a different reaction takes place producing a compound having a diallophanate group which is explained by concluding that above 100° C. the reaction takes place not only on the OH groups of the glycol urethane but also on the NH₂ or NHR₁ groups. This reaction is represented by the equation:

The reaction of the 5th class proceeds when the reaction mass is carried rapidly to a high temperature, or when the urethane in the reaction mass contains a group NHR. It has been shown that if the reaction is begun at low temperature and continued at a higher temperature, so as to form initially a polyurethane of the type of Class 2 and finally a diallophanate according to Class 5, by heating first below and then above 100° C., there is produced either a mixture of polyurethane and of diallophanate or a single composition possessing both a polyurethane group and in allophanate group, for instance of the formula:

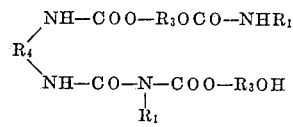

Similarly, in carrying out the reaction at 30 to 35° C. in acetone solution or in benzine solution, the ethylene glycol N-ethyl-urethane, which possesses a group NHR, follows the reaction of Class 5, while at the same temperature ordinary ethylene glycol urethane which possesses an NH₂ group gives only the polyurethane as indicated in Example 7 (Class 2).

*Example 19*

At ordinary temperature 133 grs. (1 mol.) of glycol N-ethylurethane was mixed with 96 grs. (½ mol.) of toluylene diisocyanate. The reaction began itself and the temperature rose to 58° C. and fell. The mixture was allowed to rest from 12–15 hrs. and thereafter the temperature was raised to 100° for 5 hours. This produced a solid that was crystallized in six times its weight in alcohol. In the first crystallization 70 grs. of a product melting at 165°, which is constituted by the diallophanate and the following formula, was obtained:

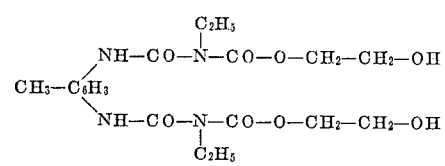

This is tolylene di(ethanol ethyl allophanate). The mother liquor was concentrated by evaporation and yielded 140 grs. of crystalline product melting at 103° and constituted by a polyurethane of the formula:

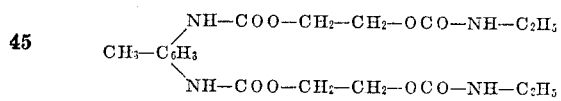

This is tolylene di(ethyl carbamyl urethane).

*Example 20*

Into 87 grs. of tolylene diisocyanate at 100° C. there was slowly poured 105 grs. of glycol urethane. The reaction was exothermic and the temperature rose to 112°. When the reaction had subsided, the mass was kept at 100° for 5–6 hrs. by heating. The product was a crystalline solid which was purified by crystallization from 6 times its weight of alcohol was allowed to cool to 50°. Thus there was obtained 175 grs. of a product melting at 185° constituted by mixed allophanate polyurethane of the formula:

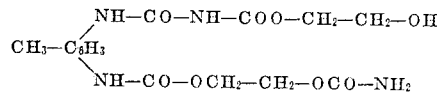

which is slightly soluble in the cold in the usual solvents but is soluble in hot water, alcohol and dioxane. During purification by crystallization there were recovered 12 grs. of polyurethane of the formula:

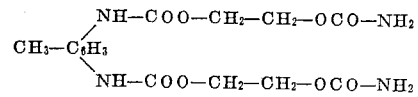

*Example 21*

Into 87 grs. (½ mol.) of toluylene diisocyanate at 100° C. there was introduced little by little 119 grs. of glycol N-methylurethane (1 mol.) the rate of addition and cooling being used to prevent the temperature from exceeding 105°. When the introduction ended the mass was kept at 100° for 12 hours. After cooling a hard mass was obtained which was purified by crystallization in dioxane, yielding 190 grs. of a product melting at 140° which is constituted by the mixed polyurethane allophanate of the formula:

$$\text{CH}_3\text{-C}_6\text{H}_3 \begin{cases} \text{NH-C(=O)-O-CH}_2\text{-CH}_2\text{-O-C(=O)-NH-CH}_3 \\ \text{NH-C(=O)-N(CH}_3\text{)-C(=O)-O-CH}_2\text{-CH}_2\text{-OH} \end{cases}$$

Example 22

One heats in a reaction vessel, while agitating the mixture, 105 grs. (1 mol.) of glycol urethane, and of hexamethylene diisocyanate ½ mol. (84 grs.). The mixture became homogeneous when the temperature reached 175°, and as it rose still further, a vigorous exothermic reaction began. Heating is terminated and the temperature rose to 150°, falling thereafter, and crystals appeared at 130°. To complete the reaction the mass was held at 125° for 2 to 3 hours. A crystalline product was obtained by cooling, which was purified by recrystallization in 4 times its weight of a mixture of 50–50 water and dioxane. Thus there was obtained 172 grs. of a product melting at 152°, constituted by the diallophanate of the formula:

$$(\text{CH}_2)_6 \begin{cases} \text{NH-CO-NH-COO-CH}_2\text{CH}_2\text{-OH} \\ \text{NH-CO-NH-COO-CH}_2\text{CH}_2\text{-OH} \end{cases}$$

Example 23

With vigorous agitation while heating on the water bath, 1 mol. of glycol N-ethylurethane and ½ mol. of hexamethylene diisocyanate are mixed and after 7 hours of heating at 95° C. the mixture is transformed from a liquid to a hard solid which is purified by crystallization in 750 cc. of alcohol. 205 molar parts of a product melting at 142° is obtained, being the diallophanate of the formula:

$$(\text{CH}_2)_6 \begin{cases} \text{NH-CO-N(C}_2\text{H}_5\text{)-CO-O-CH}_2\text{-CH}_2\text{-OH} \\ \text{NH-CO-N(C}_2\text{H}_5\text{)-CO-O-CH}_2\text{-CH}_2\text{-OH} \end{cases}$$

CLASSES 6, 7 AND 8

In Classes 2 and 5 there were employed 2 moles of monourethane for 1 of diisocyanate. The applicant has found that it is equally possible to react diisocyanate on glycol monourethane in different proportions so that one has only 1 molecule of monourethane to 1 molecule of diisocyanate and, depending upon the temperature at which the reaction proceeds and the raw materials employed, one may obtain products of different sorts.

CLASS 6

By carrying out the reaction at low temperature below about 100° C., there is obtained a mixed polyurethane isocyanate according to the following reaction (Class 6).

$$R_4\begin{pmatrix}\text{NCO} \\ \text{NCO}\end{pmatrix} + \begin{matrix}R_1 \\ R_2\end{matrix}\text{N-COO-R}_3\text{-OH=}R_4 \longrightarrow R_4\begin{pmatrix}\text{NH-COO-R}_3\text{-O-CO-N}\begin{pmatrix}R_1\\R_2\end{pmatrix} \\ \text{N=CO}\end{pmatrix}$$

CLASS 7

By changing the urethane and carrying out the reaction under the conditions of Class 6, the reaction proceeds as follows:

$$R_4\begin{pmatrix}\text{NCO} \\ \text{NCO}\end{pmatrix} + \begin{matrix}R_1 \\ H\end{matrix}\text{N-COO-R}_3\text{-OH=}R_4 \longrightarrow R_4\begin{pmatrix}\text{NH-CO-N(R}_1\text{)-COO-R}_3\text{-OH} \\ \text{N=CO}\end{pmatrix}$$

The product being an allophanate isocyanate.

These reactions can be carried out in an anhydrous solvent such as acetone, tetrahydrofurane, and benzine at low temperature, for instance 30°, or without a solvent but at a temperature a little higher in order to make the reaction faster. No water should be present in the reaction mixture because it enters into reaction with the NCO group and forms a urea linkage between 2 molecules of the derivatives obtained according to the reaction of Class 6 or 7.

The disubstituted urethanes, such as in the first member of the reaction of Class 6 do not give the reaction of Class 7 because they lack the free hydrogen on the urethane nitrogen. The urethane with unsubstituted or monosubstituted nitrogen both react in the process of Classes 6 and 7, but the urethanes monosubstituted on N preferentially react as in Class 7. The products of Classes 6 and 7 are stable at room temperature.

CLASS 8

The products of Class 6 in which one or both of $R_1$ and $R_2$ are H, and also the products of Class 7 undergo a further reaction when heated sufficiently. For example, when the products of Class 6 in which $R_1$ is H, when heated to about 100° C., undergo the reaction:

$$R_4\begin{pmatrix}\text{NH-COO-R}_3\text{-OCO-NHR}_1 \\ \text{N=CO}\end{pmatrix} \longrightarrow R_4\begin{pmatrix}\text{NH-COO-R}_3 \\ \text{NH-CO-N(R}_1\text{)-CO-O}\end{pmatrix}$$

This product is a cyclic urethane allophanate and also a polyurethane as it has the group N—COO—$R_3$ —OOC—N.

The products of Class 7 also undergo cyclization at the same temperature range, yielding the same products produced from Class 6.

If the temperature is still further raised in the reactions of Classes 6 and 7, the cyclization occurs during the course of those reactions and the product is a mixture of Class 6 or 7 with the cycled products of Class 8, or sometimes Class 8 alone. This phenomenon occurs so readily when monosubstituted glycol urethanes are reacted with toluylene diisocyanates that the cyclic compound is produced initially, in one step, even when the temperature is below 100°.

In view of the foregoing, it is observed that one can obtain the products of Class 8 from the products of Classes 6 and 7 by cycling those classes. The following examples are illustrative.

Example 24

At ordinary temperature 1 mol. of glycol urethane is mixed with 1 mol. of toluylene diisocyanate, the mixture is heated and when the temperature reaches 60°, an exothermic reaction begins and heating is stopped. The temperature rises to 80–90° and the temperature is arrested there by cooling. When the violence of the reaction is reduced heat is applied for about 4 hours to maintain a temperature of 80°. A frangible mass is obtained, pulverized, and extracted with ether to remove unreacted raw materials.

The product is 170 molar parts of a product melting at 122–123° C. By heating this product above its fusion point it melts and solidifies again, having a new fusion point of 174–175°. The first product is represented by the formula (Class 6):

$$\text{CH}_3\text{-C}_6\text{H}_3\begin{cases}\text{NH-COO-CH}_2\text{-CH}_2\text{-OCO-NH}_2 \\ \text{NCO}\end{cases}$$

M. P. 123° C.

When this product is heated above 100° there is produced the cyclic compound (Class 8):

$$\text{CH}_3\text{-C}_6\text{H}_3\begin{cases}\text{NH-COO-CH}_2\text{-CH}_2 \\ \text{NH-CO-NH-COO}\end{cases}$$

M. P. 174° C.

Example 25

Into a solution of 52 parts by weight of glycol urethane in acetone then is poured 87 parts by weight of toluylene diisocyanate while holding the temperature at 30°. When the addition ends the mass is left for 30–40 hours at room temperature. A white solid is obtained which is air dried, weighs 104 parts by weight, melts at 120° and is a polyurethane-isocyanate of the formula of Example 24. The concentration of the mother liquor produces 30 grs.

of the cyclic product which melts at 175°, and is the same as that in Example 24.

*Example 26*

A mixture of 66.5 parts by weight of glycol N-ethyl urethane and 87 parts by weight of toluylene diisocyanate (½ molar quantities) with 200 parts by weight of benzine was agitated vigorously at 20 to 25° C. until a homogeneous liquid was obtained. The mixture was allowed to rest for 48 hours at room temperature after which a viscous mass separated that was removed and dried in the air. Thus there was obtained 126 parts by weight of a product melting at 90° and represented by the formula:

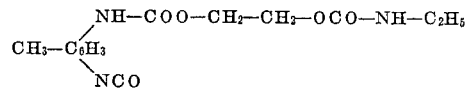

It is a polyurethane/isocyanate. By distilling the benzine mother liquor, there were recovered 20 grs. of a product melting at 152° which is the product of cyclization of the polyurethane isocyanate derivative above formulated.

*Example 27*

59.5 parts by weight of glycol N-ethyl urethane were added to 84 parts by weight (½ molar quantities) of hexamethylene diisocyanate and heated 5 hours at 30° then 15–16 hours at 40–45°. A solid mass was obtained that was broken and washed with methyl ethylketone. The residual product was insoluble, weighed 107 parts by weight, melted at 134°, and is the cyclic compound of the formula:

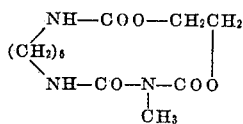

*Example 28*

In acetone solution 66.5 grs. (½ mol.) of N-ethyl urethane and ½ mol. of hexamethylene diisocyanate were mixed at ordinary temperature, which was raised progressively to 30–35° and held there for 4 to 5 hours. The mixture thereafter was raised to the boiling point of the acetone for 4 to 5 hours. The acetone was removed by distillation and the residue was washed with ether. A product weighing 136 parts by weight, melting at 127°, the allophanate/isocyanate of the formula (Class 7):

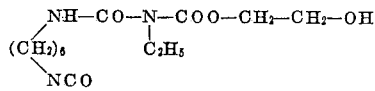

was obtained. This compound was heated at 100° for 4 to 5 hours and was transformed to a cyclic compound melting at 142° and represented by the formula (Class 8):

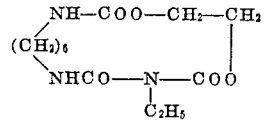

*Example 29*

For 20 hours at 30° C. a mixture of 80.5 grs. of glycol N-diethylurethane and 84 grs. of hexamethylene diisocyanate were reacted, yielding a viscous mass that did not crystallize. The product was not modified by dry heating from 100 to 120°. It is the mixed polyurethane/isocyanate of the formula:

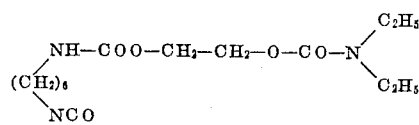

It did not cycle because it possesses no free hydrogen on the nitrogen of the urethane.

*Example 30*

Into 168 grs. (1 mol.) of hexamethylene diisocyanate heated to 55° there was introduced little by little with agitation over a period of 5 to 6 hours 119 grs. (1 mol.) of ordinary urethane of propylene glycol and the reaction was brought to an end by raising the temperature for several hours to 60°. There was produced a hard mass that was broken up and washed with ether to eliminate the unreacted raw materials. There was thus obtained a product melting at 180° having the following formula:

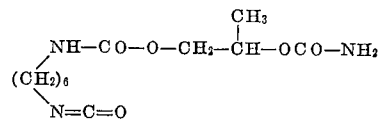

It is a polyurethane/isocyanate and when heated to 100 to 160° was transformed into a cyclic polyurethane represented by the formula:

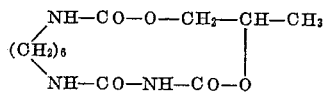

By these methods there are produced new compounds which are the reaction products of glycol urethanes and the organic isocyanates. Tht organic isocyanates are the esters of isocyanic acid, and the glycol urethanes are described in the cases hereinabove identified, which are included herein by reference. In one of the subdivisions of this numerous class, the mono or polyisocyanates are reacted with the glycol monourethanes in proportions such that the number of isocyanate groups is at least equal to the number of monourethane molecules; in another, the monoisocyanates and the alkylene diurethanes of glycol are reacted in the proportion of 2 molecules of isocyanate for 1 of urethane; in another the monoisocyanates and the glycol alkylol urethanes are reacted in the proportion of 2 molecules of isocyanate for 1 of urethane; in another the preceding class is reacted only at a temperature below 100°; in another the diisocyanates and the monourethanes of glycol are reacted in the proportions of 1 of isocyanate to 2 of urethane at a temperature above 100° C.; in another a diisocyanate and a glycol urethane in the proportions of 1 to 2 molecules, respectively, are reacted in two steps, the first below 100 and the second above 100; in another the diisocyanates and monourethanes are reacted molecule for molecule at a temperature below 100°, and in yet another this product is cycled by heat at a temperature on the order of 100 to 120°.

The new products produced by these reactions may all be called carbamyl glycolurethanes because they all include the group carbamyl >NH—CO— and the group glycolurethane >N—COO—R—O—. But because of their structure, other nomenclature may be applied to these new products. So all products from Classes 1, 2, 3, 4, 6 and 8, may be called polyurethanes because they include at least one group

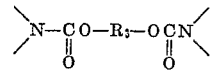

For the same reason they may also be regarded as glycolurethane carbamates.

As the first definition based upon the presence of the groups carbamyl and glycol urethane in the new products is more general it will be used for the generic claim.

The syllable "eth" in the word urethane is not a terminological reference to any member of the alkyl or alkane radicals and is not derived from the syllable "eth" in the word ethylene glycol, but is to be understood as a component part of the generic term urethane which refers to classes of complex compounds some of which are found in the examples herein.

As many apparently widely different embodiments of the present invention may be made without departing from the spirit and scope thereof, it is to be understood that the invention is not limited to the specific embodiments.

What is claimed is:

1. The compounds of the formula

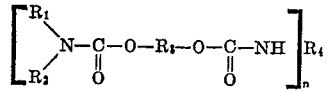

in which $n$ is one of the digits 1 and 2, each of $R_1$ and $R_2$ is a member of a group consisting of H, alkyl monovalent radicals having 1 to 10 carbon atoms inclusively, and aralkyl and aryl monocyclic monovalent radicals, $R_3$ is a divalent alkyl radical having 2 to 10 carbon atoms inclusively, $R_4$ is a radical of the group consisting of alkyl having 1 to 10 carbon atoms inclusively and aryl and alkaryl monocyclic, $R_4$ being monovalent if $n=1$ and divalent if $n=2$ and $R_4$ being different from $R_2$ when $R_1$ represents H and $n$ represents 1.

2. The dicarbamic acid esters of glycols of the formula

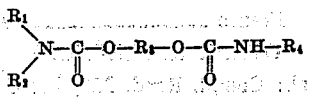

in which $R_1$ and $R_2$ are one of a group consisting of H, alkyl monovalent radicals having 1 to 10 carbon atoms inclusively and aralkyl and aryl monocyclic monovalent radicals, $R_3$ is a divalent alkyl radical having 2 to 10 carbon atoms inclusively, $R_4$ is a monovalent radical of the group consisting of alkyl having 1 to 10 carbon atoms inclusively and aryl and alkaryl monocyclic, $R_4$ being different from $R_2$ when $R_1$ represents H.

3. The compounds of the formula

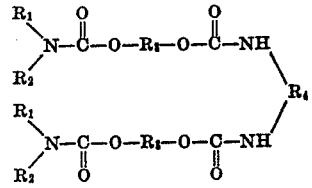

in which $R_1$ and $R_2$ are one of a group consisting of H, alkyl monovalent radicals having 1 to 10 carbon atoms inclusively and aralkyl and aryl monocyclic monovalent radicals, $R_3$ is a divalent alkyl radical having 2 to 10 carbon atoms inclusively, $R_4$ being a divalent radical of the group consisting of alkyl having 1 to 10 carbon atoms inclusively and aryl and alkaryl monocyclic.

4. Ethylene glycol N-monophenyl dicarbamate,

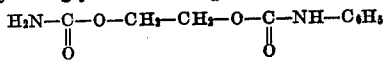

5. Ethylene glycol N-monophenyl N'-monoethyl dicarbamate,

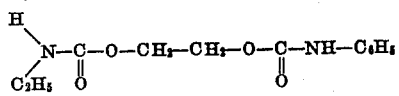

6. The di(ethylene glycol urethane) hexamethylene dicarbamic ester having the formula:

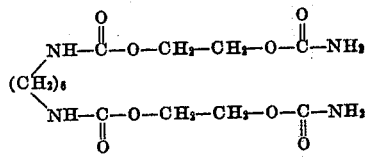

7. The di(ethylene glycol diethyl urethane) hexamethylene dicarbamic ester having the formula:

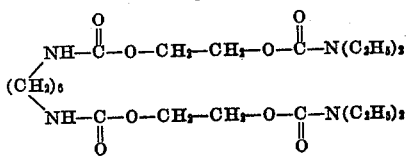

8. The (diethylene glycol urethane) toluylene dicarbamic ester having the formula:

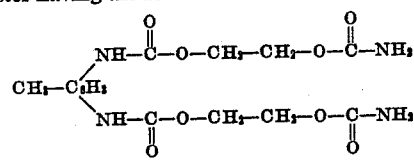

9. The method of preparing dicarbamic acid esters of glycols of the formula:

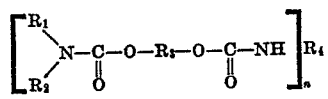

which comprises reacting at a temperature below 100° C. about $n$ molecules of a glycol monocarbamate of the formula:

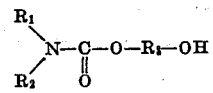

with about one molecule of an isocyanic ester of the formula $R_4(N\!=\!C\!=\!O)_n$, $n$ being one of the digits 1 and 2, each of $R_1$ and $R_2$ a member of a group consisting of H, alkyl monovalent radicals having 1 to 10 carbon atoms inclusively, and aralkyl and aryl monocyclic monovalent radicals, $R_3$ a divalent alkyl radical having 2 to 10 carbon atoms inclusively, $R_4$ a radical of the group consisting of alkyl having 1 to 10 carbon atoms inclusively and aryl and alkaryl monocyclic, $R_4$ being monovalent if $n=1$ and divalent if $n=2$ and $R_4$ being different from $R_2$ when $R_1$ represents H and $n$ represents 1.

10. The method of preparing dicarbamic acid esters of glycols that comprises reacting in equimolecular proportions a glycol monocarbamate of the formula:

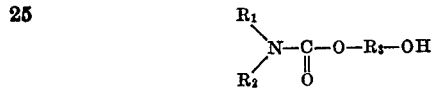

with a monoisocyanic ester $R_4\!-\!N\!=\!C\!=\!O$, $R_1$, $R_2$, $R_3$ and $R_4$ having the same meaning as in claim 1.

11. The method of preparing dicarbamic esters of glycols that comprises reacting 2 molecules of a glycol monocarbamate of the formula:

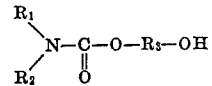

with one molecule of a diisocyanic ester

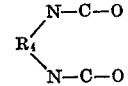

$R_1$, $R_2$, $R_3$ and $R_4$ having the same meaning as in claim 2.

12. The method of making a glycol polyurethane that comprises mixing glycol urethane with phenyl isocyanate in equimolecular proportions in organic solvent at a temperature of about 15° C. and isolating the product $C_6H_5\!-\!NH\!-\!COO\!-\!CH_2CH_2\!-\!OCO\!-\!NH_2$ after about 12 hours.

13. The method of making a glycol polyurethane that comprises mixing glycol ethyl urethane with phenyl isocyanate in equimolecular proportions, heating between 80 and 90° C. for about 7–8 hours, and isolating the product $C_6H_5\!-\!NH\!-\!CO\!-\!O\!-\!CH_2CH_2\!-\!O\!-\!CO\!-\!NH\!-\!C_2H_5$.

14. The method of making a glycol polyurethane that comprises mixing glycol urethane and hexamethylene diisocyanate in the proportion of two mols of urethane to 1 of diisocyanate in organic solvent, maintaining the mixture at about 30–35° C. for about 12 hours, and isolating the product.

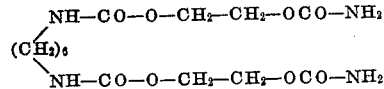

15. The method of making a glycol polyurethane that comprises mixing glycol N-diethylurethane with hexamethylene diisocyanate in relative molar proportions of about 2–1, heating to about 100° C. for about 6–8 hours, and isolating the product

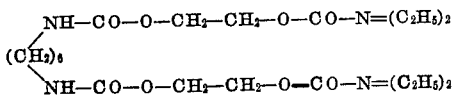

16. The method of making a glycol polyurethane that comprises mixing glycol urethane and toluylene diisocyanate in relative molar proportions of about 2–1, heating to about 45° C. to initiate the reaction, terminating the heating until the violence of the reaction subsides, and heating to about 65–70° C. for about 5–6 hours, and isolating the product.
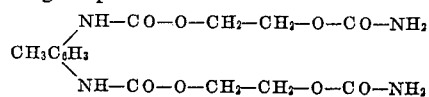
References Cited in the file of this patent
UNITED STATES PATENTS
| | | |
|---|---|---|
| 2,441,298 | Strain | May 11, 1948 |
| 2,527,240 | Baird et al. | Oct. 24, 1950 |
FOREIGN PATENTS
| | | |
|---|---|---|
| 797,286 | France | Apr. 23, 1936 |
OTHER REFERENCES
Delaby et al.: Compt. Rend. 229, 241–2 (1949).